United States Patent
Mordacci et al.

(10) Patent No.: US 11,184,407 B2
(45) Date of Patent: Nov. 23, 2021

(54) LAWFUL INTERCEPTION SECURITY

(71) Applicant: Telefonaktiebolaget LM Ericsson (publ), Stockholm (SE)

(72) Inventors: Alessandro Mordacci, Solna (SE); Giuseppe Amato, Salerno (IT)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 163 days.

(21) Appl. No.: 16/478,333

(22) PCT Filed: Feb. 6, 2017

(86) PCT No.: PCT/SE2017/050104
§ 371 (c)(1),
(2) Date: Jul. 16, 2019

(87) PCT Pub. No.: WO2018/143845
PCT Pub. Date: Aug. 9, 2018

(65) Prior Publication Data
US 2019/0373023 A1    Dec. 5, 2019

(51) Int. Cl.
*H04L 29/06* (2006.01)
*H04L 9/06* (2006.01)
*H04W 12/03* (2021.01)
*H04W 12/80* (2021.01)

(52) U.S. Cl.
CPC .......... *H04L 63/306* (2013.01); *H04L 9/0662* (2013.01); *H04W 12/03* (2021.01); *H04W 12/80* (2021.01)

(58) Field of Classification Search
CPC ............................. H04L 63/306; H04L 9/0662

USPC .......................................................... 726/22
See application file for complete search history.

(56) References Cited

U.S. PATENT DOCUMENTS

| | | | |
|---|---|---|---|
| 9,641,598 B1 * | 5/2017 | Yuhan | H04L 12/14 |
| 9,749,127 B1 * | 8/2017 | Doane | H04L 9/0662 |
| 2009/0110188 A1 * | 4/2009 | Dolgunov | H04L 9/0861 380/28 |

(Continued)

OTHER PUBLICATIONS

Fernandes et al., "Randomness in Virtual Machines", IEEE, 2013, pp. 282-286, doi: 10.1109/UCC.2013.57. (Year: 2013).*

(Continued)

*Primary Examiner* — Peter C Shaw
(74) *Attorney, Agent, or Firm* — Sage Patent Group (57) ABSTRACT

A first lawful interception (LI) function transmits, to a second LI function in a virtualized network function, VNF, a request for random number generator, RNG, data, characterizing a random number generator in the second LI function. The RNG data is tested, resulting in a randomness test result that is indicative of randomness of numbers generated by the RNG in the second LI function. If the randomness is below a first threshold, mitigation takes place of any undesired effect associated with the randomness being less than the threshold value. A corresponding method is performed by the second LI function, receiving the request for RNG data, obtaining and transmitting the RNG data to the first LI function. Verification can thereby be made whether a LI function in a VNF has a proper level of entropy source for use by its cryptographic operations and, if not, perform mitigation.

30 Claims, 5 Drawing Sheets

(56) References Cited

U.S. PATENT DOCUMENTS

| | | | |
|---|---|---|---|
| 2009/0208014 A1* | 8/2009 | Betouin | H04L 9/0662 380/277 |
| 2015/0006601 A1 | 1/2015 | Aissi et al. | |
| 2015/0117636 A1 | 4/2015 | Best et al. | |
| 2015/0277856 A1* | 10/2015 | Payne | G06F 7/58 708/255 |
| 2016/0328211 A1* | 11/2016 | Nordholt | G06F 7/588 |
| 2018/0136907 A1* | 5/2018 | Bohdan | G06F 7/584 |
| 2018/0217817 A1* | 8/2018 | Gorfinkel | H04L 9/0852 |

OTHER PUBLICATIONS

IP.com, "Method and System for Generating Pseudo Random Nos. Across Cloned Virtual Machines", Apr. 6, 2010, IP.com, IPCOM00019465, pp. 1-2. (Year: 2010).*

Hamamreh et al., "An Efficient Security Method Based on Exploiting Channel State Information (CSI)", IEEE, doi: 10.1109/FIT.2017. 00058, 2017, pp. 288-293. (Year: 2017).*

Qu et al., "How to Test the Randomness from the Wireless Channel for Security?", IEEE, doi: 10.1109/TIFS.2021.3092051,2021, pp. 1-14. (Year: 2021).*

International Search Report and Written Opinion of the International Searching Authority for International Application No. PCT/SE2017/050104 dated Oct. 25, 2017.

ETSI TR 103 308 V1.1.1, "CYBER; Security baseline regarding LI and RD for NFV and related platforms," Technical Report, European Telecommunications Standards Institute (ETSI), Jan. 2016, 17 pages.

Yevgeniy Dodis, "Tutorial on Randomness and Cryptography," course on Advanced Cryptography held by NYU Computer Science Department Spring 2014, 76 pages.

ETSI TS 101 671 V3.14.1, "Lawful Interception (LI); Handover interface for the lawful interception of telecommunications traffic," Technical Specification, European Telecommunications Standards Institute (ETSI), Mar. 2016, 159 pages.

ETSI TR 102 661 V1.2.1, "Lawful Interception (LI); Security framework in Lawful Interception and Retained Data environment," Technical Report, European Telecommunications Standards Institute (ETSI), Nov. 2009, 46 pages.

TVRA tools by C3L, "Secure Cryptographic Mechanisms—entropy and randomness," http://www.tvra-tools.eu/blog/technology/cryptography/secure-cryptographic-mechanisms-entropy-and-randomness/, accessed Nov. 21, 2016, 3 pages.

Ristenpart et al., "When Good Randomness Goes Bad: Virtual Machine Reset Vulnerabilities and Hedging Deployed Cryptography," Dept of Computer Science and Engineering, University of California, San Diego, Proceedings of Network and Distributed Security Symposium (NDSS '10), 2010, 18 pages.

README, "Haveged, an entropy source," Haveged 1.9.1, published on Feb. 11, 2014, 8 pages.

Amit Shah, "Red Hat Enterprise Linux Virtual Machines: Access to Random Numbers Made Easy," Red Hat Enterprise Linux Blog, Mar. 9, 2015, 3 pages.

Rukhin et al., "A Statistical Test Suite for Random and Pseudorandom Number Generators for Cryptographic Applications," National Institute of Standards and Technology, Special Publication 800-22, Revision 1a, Revised Apr. 2010, 131 pages.

"Security Requirements for Cryptographic Modules," Issued May 25, 2001, FIPS PUB 140-2, Change Notices Dec. 3, 2002, Federal Information Processing Standards Publication (Supersedes FIPS PUB 140-1, Jan. 11, 1994), 69 pages.

* cited by examiner

LAWFUL INTERCEPTION SECURITY

CROSS REFERENCE TO RELATED APPLICATION

This application is a 35 U.S.C. § 371 national stage application of PCT International Application No. PCT/SE2017/050104, filed on Feb. 6, 2017, the disclosure of which is hereby incorporated herein by reference in its entirety.

TECHNICAL FIELD

Embodiments herein relate to security in lawful interception (LI) functions deployed as virtualized network functions.

BACKGROUND

Cryptography operation robustness is strongly depending on randomness of the encryption keys it uses. In a typical computation system utilizing cryptography, randomness for key generation is dependent on the availability of an entropy source and pseudo random number generation tools. Entropy sources are usually in the form of physical events generated by a hosting computing system environment, such as human user induced mouse movements and keyboard presses. These are used as input seeds to a random number generator (RNG) or a pseudo random number generator (PRNG). The RNG or PRNG typically creates a sequence of random numbers that may be used as seeds by cryptographic algorithms for derivation of encryption keys.

Hardware based RNGs embedded in a central processing unit (CPU) are today available from major vendors (e.g. Intel, AMD, etc.). These RNGs provide a high level of entropy and they are therefore often called true random number generators (TRNGs).

With regard to software based RNGs, most operative systems provide basic functions for random number generation which can usually be configured to use different entropy sources.

It is worth noting a difference between RNGs, as an RNG may be "blocking", where in absence of external physical events, generation of random numbers stops and "non-blocking" where the RNG continues even if with less entropy. Use of "non-blocking" random generators is not recommended for critical cryptography operations since it always leads to low entropy key generation. On the other hand, blocking generators present challenges when used in systems with hard real time requirements, such as telecommunication systems. Moreover, it is worth noting that even when blocking random generators are used and when cryptography operations are very frequent, so-called entropy consumption may occur. The key generation being unaware of entropy consumption, a shorter random values string for use as seed will result and the resulting encryption keys will have poor randomness. The physical events helping the entropy to increase should then happen at faster pace. This is already a problem in current systems and there are several techniques which combine different entropy sources. Among all sophisticated entropy generators, hardware based entropy generators are the ones considered more reliable.

In a lawful interception (LI) context the security is heavily depended on robust cryptography. For example, secure sockets layer (SSL) protocol and internet protocol security (IPSEC) protocols are commonly used in LI handover interface (HI) and the internal network interface (INI) and low entropy in key generation exposes the entire LI solution to attacks. The European Telecommunications Standards Institute (ETS) recommends in their technical report TR 102 661 V1.2.1 (2009-11) that the key length of encryption keys should provide adequate protection from exhaustive attacks, which means providing sufficient randomness.

In a typical deployment of a system that is not in any way virtualized, the randomness of random number generator and the derived robustness against cryptanalysis attacks of encryption tools are statically verifiable since the vendor of the system will typically "own" the whole stack from the bottom hardware level up to upper software levels, and can typically also enforce the entropy sources to use. Moreover, an application installation will typically be changes only very seldom and always under full control by the vendor, and thereby being subject of a low risk of unwanted modifications that potentially can impact entropy sources output.

In a virtualized computing environment, e.g. in a so-called network functions virtualization (NFV) context, the entropy source is even more a critical issue. In contrast to a non-virtualized deployment as discussed above, a specific vendor has no control of the entire cloud stack (i.e. from hardware and through the hypervisor up to the application level) and an application can be instantiated, scaled and/or moved on different cloud infrastructures during its lifecycle.

A cloud service realized by a NFV infrastructure and virtual network functions (VNF) is actually a combination of different components from different software vendors plus a set of configuration descriptions and policies used to manage the service. From an operational point of view, the owner of the hardware platform, the hypervisor layer and the VNF is not one and the same entity. The resulting great flexibility improvement by implementing the service in a NFV/VNF context is anyway accompanied by difficulties in integrating and managing all the different parts of the service implementation.

NFV enables interworking between the layers via the definition of standards for application programming interfaces (APIs), common configuration protocols and service descriptors as well as for service layer agreement (SLA) guidelines between layer owners. The NFV specifications are still immature and current real implementations are not aligned.

From a security point-of-view there is a problem for a cloud service to full trust and rely on the cloud infrastructure even in presence of a security SLA and well-defined APIs. This is especially true for sensitive services and data like lawful interception and the related problem regarding random number generation is that there will be a high risk that dynamic changes in real NFV deployment, lacking of requirements and/or unclear commercial agreements between the multiple parties involved are not able in practice to guarantee the LI function embedded in VNF get a proper entropy source from underlying layers for its very sensitive cryptography operations. As a consequence of this, the resulting weak encryption is not acceptable for LI and retained data (RD) operations as stated in ETSI TR 103 308 V1.1.1 (2016-01). For example, an attacker could be able to decrypt the target data, eavesdrop the INI channel or even worse the HI channel and see interception contents. Hence, allowing activation of a LI function in such insecure context could expose a cloud service provider to high national security risks and whole service stopping legal issues.

SUMMARY

In view of the above, an object of the present disclosure is to overcome drawbacks related to security in LI functions deployed as virtualized network functions.

This object is achieved by a method performed by a first lawful interception, LI, function. The method comprises transmitting, to a second LI function in a virtualized network function, VNF, a request for random number generator, RNG, data, which characterizes a RNG in the second LI function. The RNG data is received from the second LI function in the VNF and the RNG data is tested. The testing results in a randomness test result that is indicative of randomness of random numbers generated by the RNG in the second LI function. Then, if the randomness is below a first threshold value, a mitigating action is performed for at least mitigating any undesired effect associated with the randomness being less than the threshold value.

A corresponding method is performed, in a second aspect, by the second LI function in the VNF. The method in the second LI function comprises receiving, from a first LI function outside the VNF, the request for RNG data. RNG data, which characterizes a RNG in the second LI function is then obtained, and the obtained RNG data is transmitted to the first LI function.

That is, such methods performed by the LI functions enable continuous, or on demand, verification if a LI function in a VNF has a proper level of entropy source for use by its cryptographic operations and, if not, a mitigating action may be performed.

The RNG data that is provided from the second LI function to the first LI function may, for example, comprise a plurality of random number samples generated in the second LI function and/or a value that represents a size of an entropy pool in an entropy source.

As will be described in detail below, the mitigating action performed by the first LI function as a consequence of the result of the testing of the RNG data may involve various actions such as transmission of alarm signals and transmissions of instructions to stop or restart the second LI function.

Embodiments herein are advantageous in that they make it possible to ensure LI function compliance by a continuous monitoring that the second LI function running in the VNF is relying on a good entropy source regardless of any cloud infrastructure the VNF is running on top and without requiring specific interface with underlying infrastructure layers, e.g. virtualization layers and hardware. This is in contrast to current procedures of auditing entropy source quality and randomness of generated number. A typical prior art operation is a one-time operation done as part of global security assessments, not taking into account that the deployment environment could be changing continuously in a cloud context.

Another advantage provided by the embodiments of the present disclosure is the possibility to handle, i.e. mitigate, insufficient entropy source availability with immediate correctives actions such LI deactivation and related alarms provided directly from the LI management authorized entity, i.e. the first LI function, that may be an LI administrative function (ADMF) or an LI controller, in any case with minimal involvement of other management entities.

In another aspect, there is provided first LI device that comprises input/output circuitry, a processor and a memory. The memory contains instructions executable by the processor whereby the first LI device is operative to:
  transmit, to a second LI function in a VNF, a request for RNG data, the RNG data characterizing a RNG in the second LI function,
  receive, from the second LI function in the VNF, the RNG, data,
  test the RNG data, resulting in a randomness test result that is indicative of randomness of random numbers generated by the RNG in the second LI function, and
  if the randomness is below a first threshold value, perform a mitigating action for at least mitigating any undesired effect associated with the randomness being less than the threshold value.

In a further aspect there is provided a computer program comprising instructions which, when executed on at least one processor in a wireless communication device, cause the wireless communication device to carry out any of the methods as summarized above. In yet a further aspect there is provided a carrier comprising any such computer program, wherein the carrier is one of an electronic signal, an optical signal, a radio signal and a computer readable storage medium.

These other aspects provide the same effects and advantages as summarized above in connection with the methods of the first and second aspects.

DETAILED DESCRIPTION

Figure 1A:
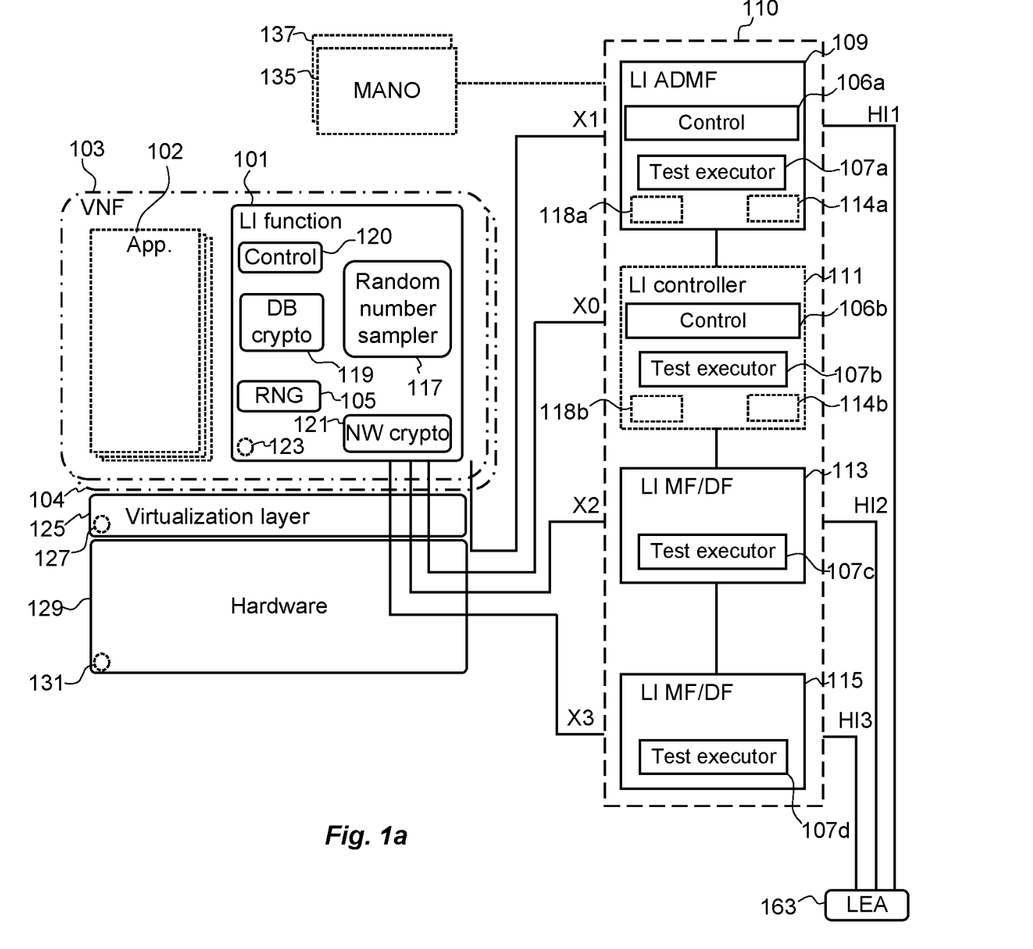
FIG. 1a schematically illustrates a LI context comprising first and second LI functions, FIG. 1b schematically illustrates an example of interconnected networks comprising LI functions.
Figure 1B:
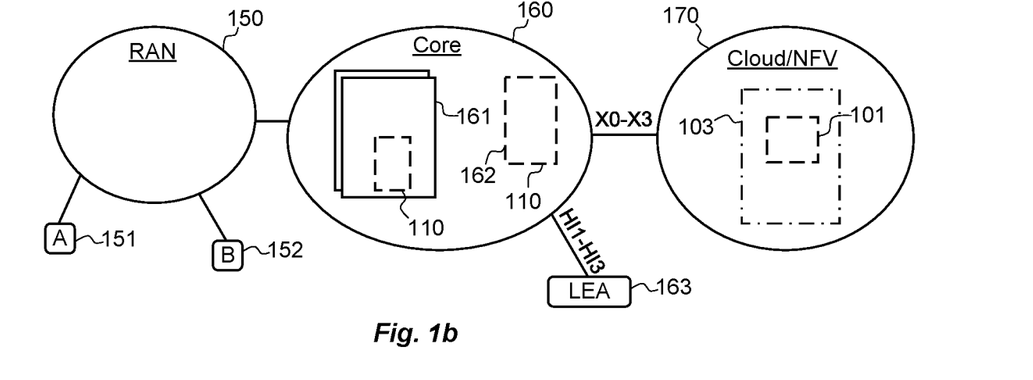

Turning first to FIG. 1a and FIG. 1b, embodiments of the present disclosure comprise a first LI function 110 and a second LI function 101, these two LI functions operating together to realize LI as will be described in detail below. As is known to the skilled person, LI is a process where a communication network operator shall provide access to intercepted content of communications (CC) and intercept related information (IRI) of mobile targets and services related to the target (e.g. call forwarding) on behalf of law enforcement agencies (LEAs). An LEA provides intercept requests (e.g., lawful authorization or warrant) to the network operator.

Referring to the schematically exemplified interconnected networks in FIG. 1b, a first communicating entity, A, 151 and a second communicating entity, B, 151 are communicating via a radio access network (RAN) 150 that is connected to a core network 160. The RAN 150 and the core network 160 may be operated by a communication network operator that has received a request for LI from a LEA 163 wherein the communicating entity A 151 is a target for the LI requested by the LEA 163. The LI request and subsequent data obtained in the LI process are communicated between the operator's core network 160 and the LEA 163 via so-called HI1, HI2 and HI3 interfaces.

As illustrated in FIG. 1b, the first LI function 110 may be realized in the core network 160, either in a form of one among many functions within one or more network nodes 161 or in a form of a dedicated host or node 162. As illustrated in FIG. 1a, the first LI function 110 may comprise an administrative function (ADMF) 109, an optional LI controller 111 and mediation and distribution functions (MF/DF) 113, 115

The second LI function 101 may be realized in a virtual network function (VNF) 103 within a network functions virtualization (NFV) architecture, or "cloud", 170. The second LI function 101 operates in connection with the first LI function 110 in the core network 160 via so-called X-interfaces. Needless to say, the core network 160 and the RAN 150 comprise a large number of interconnected entities that are outside the scope of the present disclosure and these will, consequently, not be discussed further herein. With regard to the VNF 103 within which the second LI function 101 resides, FIG. 1a illustrates that (typically together with a plurality of further VNF's 104) it runs on hardware 129 via a virtualization layer 125. As indicated, the VNF 103 may comprise one or more applications 102 in addition to the second LI function 101. Details regarding the operation of the VNF 103 in relation to the virtualization layer 104 and the hardware (e.g. computer servers) 129 are outside the scope of the present disclosure.

The second LI function 101 comprises a control function 120 that cooperate with three further functional components necessary for the cryptographic operations in the second LI function 101: a random number generator (RNG) 105, a database (DB) crypto function 119 and a network crypto function 121, The RNG 105 generate the random numbers on the base of random events from its entropy sources (anchored to datacenter hardware (HW) or hypervisor or operating system characteristics as illustrated by entropy sources 131, 127, 123 respectively). The RNG 105 may be realized by software only and as a part of application or an operating system service (e.g. /dev/random or CryptoGenRandom in an implementation using Linux and Windows, respectively, as operating system) or a service from the hardware 129 exposed via a specific operating system hardware driver (e.g. TRNG).

The RNG 105 feeds one or more DB crypto function 119 and one or more network crypto functions 121. The DB crypto functions 119 operate to protect sensitive data in use in LI database (e.g. target data in volatile memory) and data at rest (e.g. LI related logs, configuration data in files). The network crypto functions 121 operate to protect data in transit, e.g. for secure sockets layer (SSL) or internet protocol security (IPSEC) based X connections between the first LI function 110 and the second LI function 101 as well as connections between the second LI function 101 and nodes in the core network 160.

A random number sampler 117 is configured to cooperate with the control function 120 to collect a number of random values (i.e. a plurality of random number samples) generated by the random number generator 105 used both by the DB crypto function 119 and the network crypto function 121 and deliver the random number samples over an X interface to the first LI function 110. If there are more than one RNG used by different crypto functions, then multiple random stream samples (one from each RNG) may be delivered. The control function 120 may also operate to obtain further RNG data that characterizes the RNG 105, such as a size of an entropy pool used by the RNG 105

Continuing with reference to FIG. 1a, the first LI function 110, which comprises the LI ADMF 109, the optional LI controller 111 and the LI MF/DF 113, 115 may communicate with the second LI function 101 over an X interface and with the LEA 163 via an HI interface. The LI ADMF 109 and the LI controller 111, if present, comprise a control function 106a, 106b that operate to control the functions in the first LI function 110 including communication via the X and HI interfaces and internal control and communication with the MF/DF functions 113, 115. Each of the ADMF 109, the optional LI controller 111 and the MF/DF functions 113, 115 may comprise a test executor that may operate to check randomness as will be discussed in detail below and, in cooperation with a control function 106a, 106b trigger mitigating actions as will be described below.

Turning now to FIGS. 2a-c and FIG. 4, and with continued reference to FIGS. 1a and 1b, embodiments of a method performed by the first LI function 110 will be described in some detail. The method comprises a number of actions as follows.

Action 201

Figure 2A:
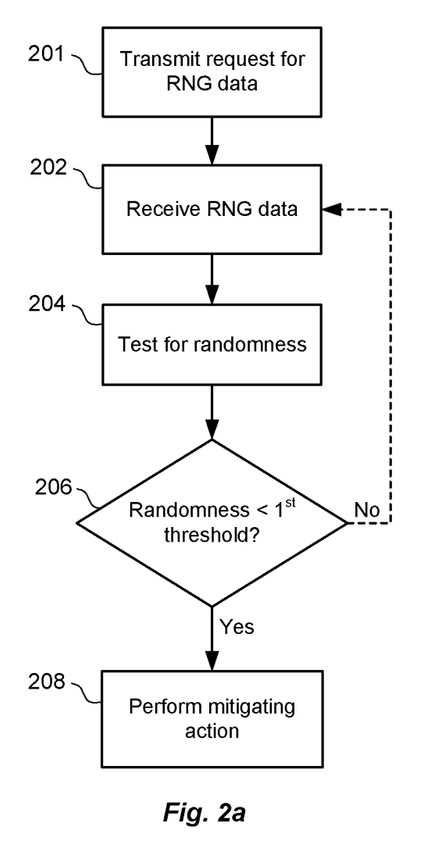
FIGS. 2a-c are flowcharts of embodiments of a method performed by a first LI function.

A transmission is made, to the second LI function 101 in the VNF 103, of a request for RNG data 400. The RNG data characterizes the RNG 105 in the second LI function 101.

Action 202

The RNG data 400 is received from the second LI function 101 in the VNF.

Action 204

The RNG data 400 is tested, resulting in a randomness test result that is indicative of randomness of random numbers generated by the RNG in the second LI function 101.

Figure 4A:
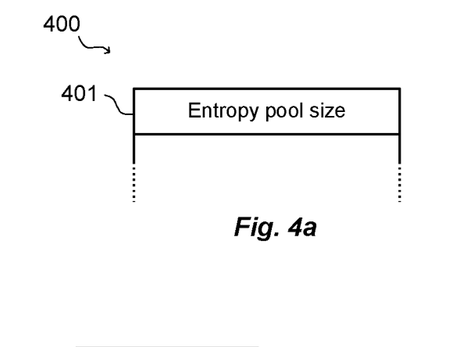
Figure 4B:
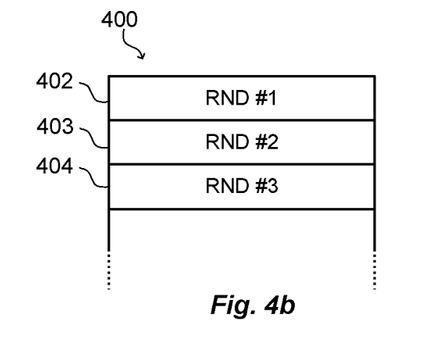

The RNG data may comprise any of a plurality of random number samples 402, 403, 404 generated in the second LI function and a value 401 representing a size of an entropy pool such as an entropy pool in any of the entropy sources 123, 125, 131.

For example, in embodiments where the RNG data 400 comprises a size of an entropy pool, then the test may be a check whether the pool is too small (i.e. below a known predetermined size threshold) it is deduced that the random number generation in the RNG 105 is inadequate. For certain use cases such embodiments of checking the size of the pool may be preferable over checking random number samples, for example because an actual test of the randomness of a plurality of random numbers would take too much time, or size checking may be preferable in terms of additional assurance. For example the random numbers could be good in terms of randomness, but the RNG entropy pool could be depleted, which would compromise the randomness of any subsequent random numbers generated by the RNG 105.

In embodiments where the RNG data comprises a plurality of random number samples generated in the second LI function 101 (e.g. in the RNG 105), testing for randomness may be performed in various ways. For example, a simple raw measure necessary but not sufficient to determine good randomness is to verify the string length of seed bits generated in connection with physical events (mouse movements, typing, hard disk seek time, network packet arrival time etc.). For example, the entropy stream in Linux has 0 to 4096 bits but actual size can be checked with the command cat /proc/sys/kernel/random/entropy_avail. Usually a value above 1000 is considered a good enough seed but it is very fluctuant, e.g. due to a lack of physical events occurring.

Several suites for statistical test of random number generator compliant to National Institute of Standars and Technology Federal Information Processing Standards NIST FIPS 140-2 and based on specification NIST SP 800-22 are available. For example, "rng-tools" available for Linux, "dieharder" from Google, "diehard" from Florida State University, "ent" from Fourmilab Switzerland and "testu01" from Montreal University. These randomness test suites provide a set from simple to very complex statistical tests which take in input a block of random value generated by any RNG and output the level of randomness by means of percentage of subtests passed. The subtest can span from counting frequency of 1 and 0 and verify equal distribution to match the random input stream and/or its parts with given statistical distribution. The number and kind of tests to be executed are configurable but it's relevant to note that the size of random samples to analyze and complexity of chosen tests lead to very different computational effort and execution time. If the test is frequently done for continuous validation, a balanced combination of test types and samples size may be considered.

Action 206

A check is made if the randomness is below a first threshold value.

The first threshold value may be, remembering that randomness is the property of a sequence of values where a value in the sequence can occur with exactly the same probability as the others, how much such probability is far from 1/n where n is the number of possible values. In the context of randomness checks, such a threshold is a value or a set of values which summarize the statistical results of several randomness tests on given samples. It may be derived by the number of successful tests against each sample or sub-sequence of it and/or several tests combined on the same sample. Moreover, when saying randomness below a first threshold value, it may be equivalent to saying that the test results have not matched the first criteria (a value or set of values) and chosen tests.

Action 208

If the check in action 206 is positive, then a mitigating action is performed for at least mitigating any undesired effect associated with the randomness being less than the threshold value.

The request in action 201 and the reception in action 202 may be performed via the X1 interface by a modification that may entail incorporation of a new command such as "GetRNGData" to allow the order from the first LI function 110 to start random number collection (or obtaining of entropy pool size) in the second LI function 101, and a response "ReplyRNGData" that comprises the samples or the size of the entropy pool. The response may comprise an error response in case of command failures.

For example, the mitigating action in action 208 may comprise transmitting an alarm signal to a management entity. Such a management entity may be a so-called management and orchestration MANO function 135 or any other appropriate management function 137.

The mitigating action in action 208 may also comprise transmitting an alarm signal to the second LI function 101 in the VNF 103, which then may take appropriate action, such as stopping and/or restarting LI, as will be described below in connection with FIG. 3.

Figure 2B:
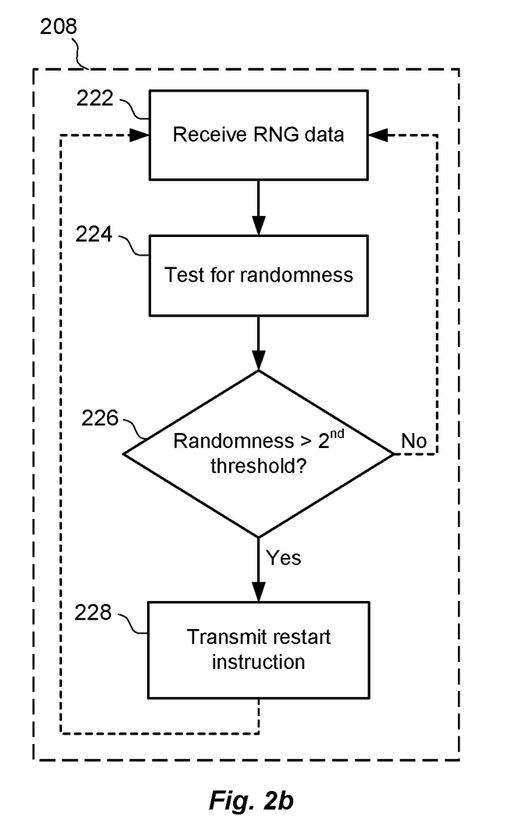

The mitigating action in action 208 may also comprise, as illustrated in FIG. 2b, actions of repeating, at least one repetition, reception 222 of RNG data, testing 224 of the RNG data, and for each repetition, if 226 the randomness is above a second threshold value, transmitting 228 an instruction to the second LI function 101 in the VNF 103 to restart.

That is, the function remain active and tries to reconnect to the second LI function 101 in the VNF 103 at a configurable time interval to perform testing again. If the randomness rises again above another configurable threshold (the second threshold), the second LI function 101 may be instructed to restart LI again. As for the first threshold value, the second threshold value may be, remembering that randomness is the property of a sequence of values where a value in the sequence can occur with exactly the same probability as the others, how much such probability is far from 1/n where n is the number of possible values. In the context of randomness checks, such a threshold is a value or a set of values which summarize the statistical results of several randomness tests on given samples. It may be derived by the number of successful tests against each sample or sub-sequence of it and/or several tests combined on the same sample. Remembering also that, when saying randomness below a first threshold value, it may be equivalent to saying that the tests results have not matched the first criteria (a value or set of values) and chosen tests. Then, similarly, saying that randomness is above the second threshold may be that the test results have matched the second criteria (a value or set of values) and the chosen tests.

Such embodiments may be useful at an initial start-up of the VNF 103, when the entropy pool might be empty or a clone of an old entropy pool is restored from a virtual machine image.

The mitigating action in action 208 may also comprise transmitting, to a management entity 135, 137, a request for re-instantiating the VNF 103.

That is, a request may be transmitted, e.g. via an existing interface extension or new interfaces, to the VNF 103 to re-instantiate/moving the VNF 103 (or just the part of the VNF 103 that executes the second LI function 101, if possible) to data center resources (e.g. management entities 135, 137) and virtualized environments which provides the proper randomness level. For example, the re-instantiation message may have parameters given in form of affinity/anti-affinity constraints or other security constraints under definition in the ETSI NFV Interface and architecture (IFA) specification group.

The mitigating action in action 208 may also comprise transmitting a deactivation instruction to the second LI function 101 in the VNF 103, the deactivation instruction comprising instructions for the second LI function 101 in the VNF 103 to stop.

Figure 2C:
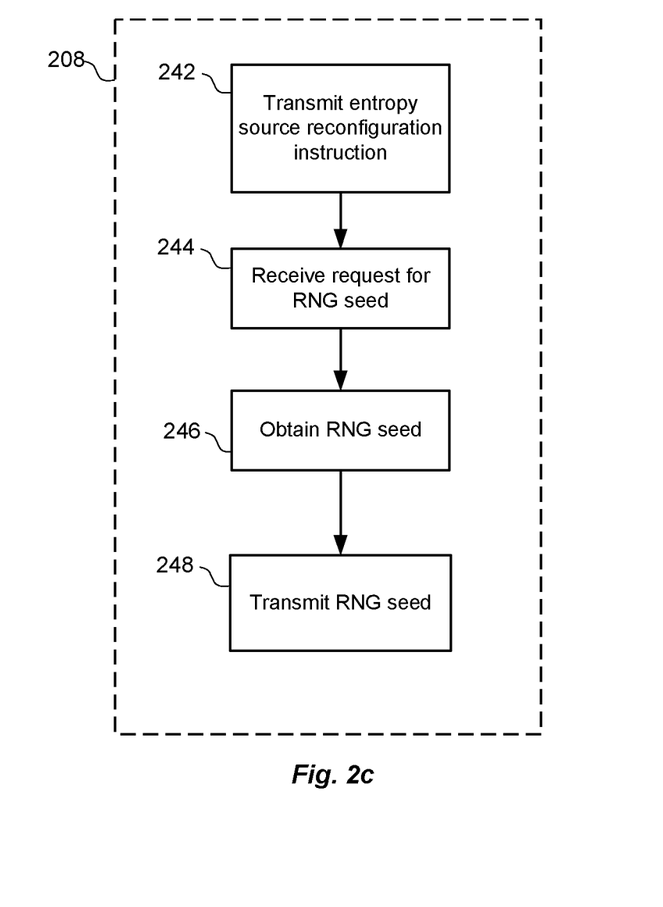

In some embodiments, as illustrated in FIG. 2c, the mitigating action 208 may comprise actions as follows.

Action 242

Transmission, to the second LI function 101 in the VNF 103, of an entropy source reconfiguration instruction.

Such a reconfiguration instruction may comprise an internet protocol (IP) address and port number of an entropy source 114a,114b or a RNG 118a,118b.

Action 244

Reception, from the second LI function 101 in the VNF 103, a request for a RNG seed.

Action 246

Obtaining a RNG seed from an entropy source 114a,114b in the first LI function 110.

Action 248

Transmission of the RNG seed to the second LI function 101 in the VNF 103.

That is, in the embodiments illustrated in FIG. 2c, the first LI function 110 configures itself as entropy source for the random number generation in the second LI function 101 or the first LI function 110 may even operate as a trusted RNG 118a,118b itself. This implies the crypto functions 119, 121 in the second LI function 101 are prepared to be configured via X1 interface commands with an external entropy source 114a,114b or external RNG 118a,118b.

In some embodiments, the transmission in action 201 of a request for RNG data 400, the reception in action 202 of RNG data 400, the testing in action 204 of the RNG data 400, the checking in action 206 of the randomness test result and the performance in action 208 of the mitigating action may performed by the LI ADMF 109. These actions may comprise communication between the first LI function 110 and the second LI function 101 via the X1 interface.

In some embodiments, the transmission in action 201 of a request for RNG data 400, the reception in action 202 of RNG data 400, the testing in action 204 of the RNG data 400, the checking in action 206 of the randomness test result and the performance in action 208 of the mitigating action may performed by the LI controller 111. These actions may comprise communication between the first LI function 110 and the second LI function 101 via the X0 interface.

In some embodiments, the transmission in action 201 of a request for RNG data 400, the reception in action 202 of RNG data 400, the checking in action 206 of the randomness test result and the performance in action 208 of the mitigating action may be performed by the LI ADMF 109 via the X1 interface. In these embodiments, the testing in action 204 of the RNG data 400 may be performed by any of the LI MF/DF 113, 115.

In some embodiments, the transmission in action 201 of a request for RNG data 400, the reception in action 202 of RNG data 400, the checking in action 206 of the randomness test result and the performance in action 208 of the mitigating action may be performed by the LI controller 111 via the X0 interface. In these embodiments, the testing in action 204 of the RNG data 400 may be performed by any of the LI MF/DF 113, 115.

It is to be noted that the X0 interface used in some of the embodiments is an interface for management of virtualized LI function today under definition in the ETSI NFV Security (SEC) specification group that implements randomness check and recovery action handling in the LI controller 111.

Figure 3:
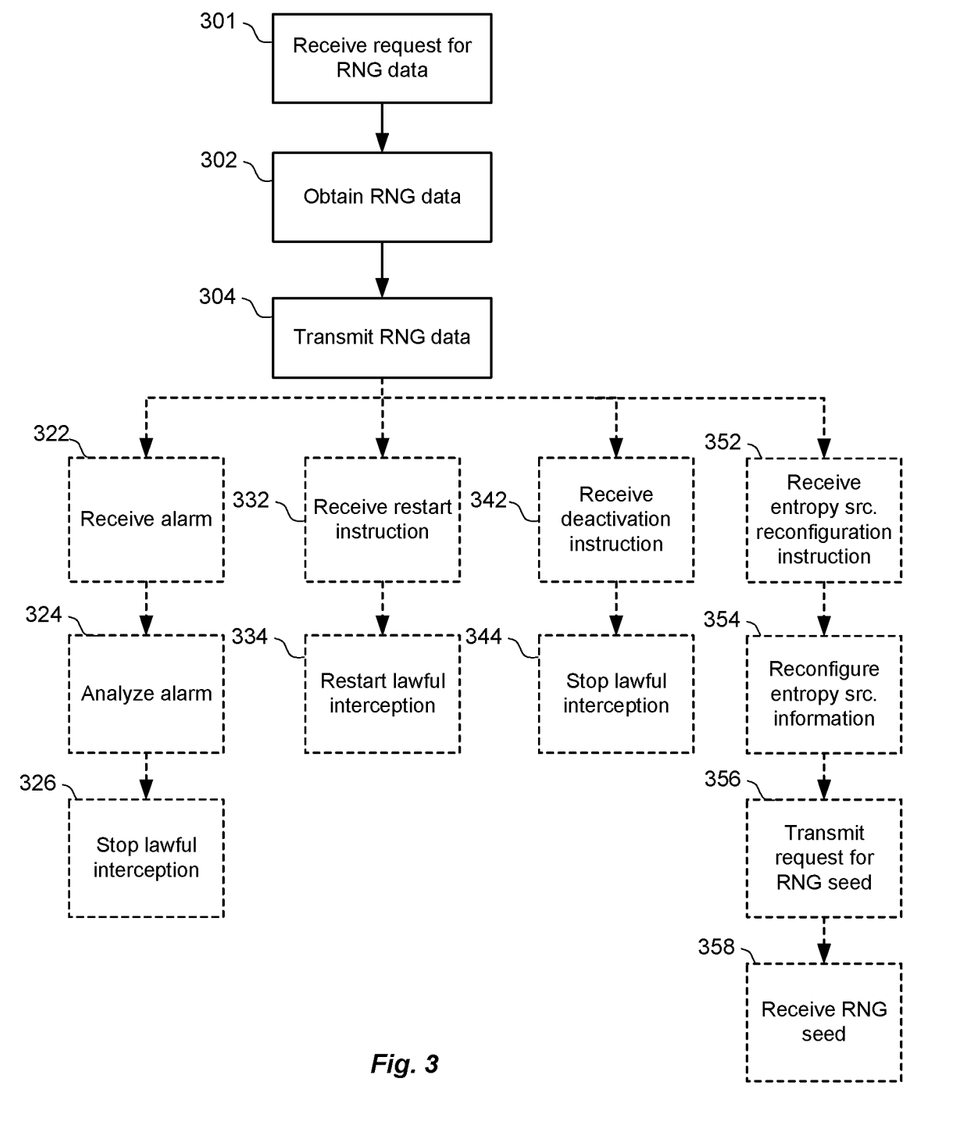
FIG. 3 is a flowchart of embodiments of a method performed by a second LI function, FIGS. 4a-b schematically illustrate RNG data, FIG. 5 schematically illustrates a first LI device, and FIG. 6 schematically illustrates a first LI device.

Turning now to FIG. 3, and with continued reference to FIGS. 1a and 1b, FIGS. 2a-c and FIG. 4, embodiments of a method performed by the second LI function 101 in the VNF 103 will be described in some detail. The method comprises a number of actions as follows.

Action 301

A request for RNG data 400 is received from the first LI function 110 outside the VNF 103.

Action 302

RNG data 400 is obtained, the RNG data characterizing the RNG 105 in the second LI function 101.

The RNG data may comprise any of a plurality of random number samples 402, 403, 404 generated in the second LI function and a value 401 representing a size of an entropy pool such as an entropy pool in any of the entropy sources 123, 125, 131.

Action 304

The RNG data 400 is transmitted to the first LI function 110.

Following the actions 301, 302 and 304, in some embodiments, an alarm signal is received from the first LI function 110 in action 322. The received alarm signal is analyzed in action 324 and, as a consequence of the analysis of the alarm signal, LI is stopped in action 326.

In some embodiments, an instruction to restart is received from the first LI function 110 in action 332. The second LI function 101 then restarts LI in action 334.

In some embodiments, an instruction to deactivate is received from the first LI function 110 in action 342. The second LI function 101 then stops LI in action 344.

In some embodiments, an entropy source reconfiguration instruction is received from the first LI function 110 in action 352. Based on the received reconfiguration instruction, entropy source information associated with the RNG 105 is then reconfigured in action 354. Such reconfiguration may involve reconfiguration of the IP address and port number of an entropy source or RNG to correspond to an entropy source 114a,114b or RNG 118a,118b in the first LI function. A request for a RNG seed is then transmitted to the first LI function 110 in action 356 and an RNG seed is subsequently received from the first LI function in action 358. Alternatively, a request for one or more random numbers may be transmitted in a scenario where an RNG 118a,118b in the first LI function is utilized.

With regard to implementations of the embodiments described herein, it is to be noted that checking the entropy pool, should be done via a secure connection between the first LI function 110 and the second LI function 101, to avoid that a potential attacker injects false information, i.e. a classic "man in the middle" attack.

In principle, if encryption keys are generated based on a depleted entropy pool, the information provided from the second LI function 101 in the VNF 103 (e.g. to nodes in the core network 160) is subject to "man in the middle" attacks. This means that an attacker could inject a good sequence of random numbers from an external good entropy source to hide the attack. However, in practice attacks based on a depleted entropy tools are computationally hard. Hence, a "man in the middle" attack of this kind would not be feasible in real time. If the entropy is checked frequently enough, using the embodiments described herein, and the threshold in the randomness check is high enough, the embodiments herein provide an effective defense.

On the other hand, all secure connections to the VNF 103 that have been made with a potentially depleted entropy pool should be regarded as insecure. This includes the secure connection used to measure entropy, i.e. the embodiments described herein. Hence, at start-up an entropy check should be performed before using the VNF 103 to perform LI. If the entropy is too low the session should be closed and reopened to avoid using a potentially vulnerable key for a long time, which could allow an attacker to break the encryption and perform a man in the middle attack. To avoid this, the next entropy measurement shall be done with a newly generated key and so on. Even with a reduced entropy pool, there are sequence numbers and other mechanisms used to generate a new key that would ensure an attacker would still need a considerable amount of time to break the encryption.

Figure 5:
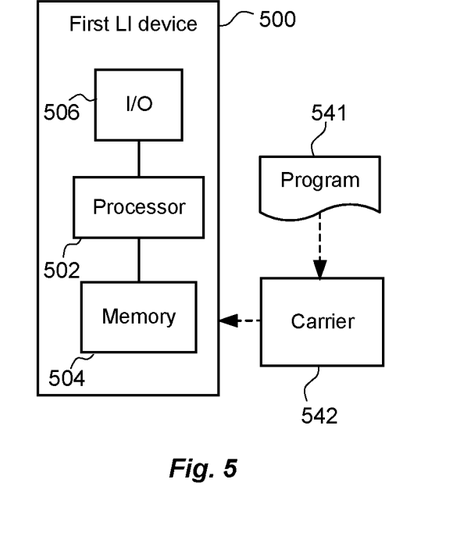

Turning now to FIG. 5, a first LI device 500 will be described in some detail. The first LI device 500, which may correspond to the first LI device 110 in FIG. 1, comprises input/output circuitry 506, a processor 502 and a memory 504. The memory 504 contains instructions executable by the processor 502 whereby the first LI device 500 is operative to:

transmit, to a second LI function 101 in a virtualized network function, VNF 103, a request for random number generator, RNG, data 400, the RNG data 400 characterizing a RNG 105 in the second LI function 101, receive, from the second LI function 101 in the VNF 103, the RNG, data 400, test the RNG data 400, resulting in a randomness test result that is indicative of randomness of random numbers generated by the RNG 105 in the second LI function 101, and if the randomness is below a first threshold value, perform a mitigating action for at least mitigating any undesired effect associated with the randomness being less than the threshold value.

The instructions that are executable by the processor 502 may be software in the form of a computer program 541. The computer program 541 may be contained in or by a carrier 542, which may provide the computer program 541 to the memory 504 and processor 502. The carrier 542 may be in any suitable form including an electronic signal, an optical signal, a radio signal or a computer readable storage medium.

In some embodiments, the first LI device 500 is operative such that the mitigating action comprises:
 transmitting an alarm signal to a management entity 135, 137.

In some embodiments, the first LI device 500 is operative such that the mitigating action comprises:
 transmitting an alarm signal to the second LI function 101 in the VNF 103.

In some embodiments, the first LI device 500 is operative such that the mitigating action comprises:
 repeating, at least one repetition, reception of RNG data 400, testing of the RNG data 400, and
 for each repetition, if the randomness is above a second threshold value, transmitting an instruction to the second LI function 101 in the VNF 103 to restart.

In some embodiments, the first LI device 500 is operative such that the mitigating action comprises:
 transmitting, to a management entity 135, 137, a request for re-instantiating the VNF 103.

In some embodiments, the first LI device 500 is operative such that the mitigating action comprises:
 transmitting a deactivation instruction to the second LI function 101 in the VNF 103, the deactivation instruction comprising instructions for the second LI function 101 in the VNF 103 to stop.

In some embodiments, the first LI device 500 is operative such that the mitigating action comprises:
 transmitting, to the second LI function 101 in the VNF 103, an entropy source reconfiguration instruction,
 receiving, from the second LI function 101 in the VNF 103, a request for a RNG seed,
 obtaining a RNG seed from an entropy source 114a, 114b in the first LI function 110, and
 transmitting the RNG seed to the second LI function 101 in the VNF 103.

In some embodiments, the first LI device 500 is operative such that the transmission of a request for RNG data 400, the reception of RNG data 400, the testing of the RNG data 400, the checking of the randomness test result and the performance of the mitigating action are performed by an LI administrative function, ADMF 109.

In some embodiments, the first LI device 500 is operative such that the transmission of a request for RNG data 400, the reception of RNG data 400, the testing of the RNG data 400, the checking of the randomness test result and the performance of the mitigating action are performed by an LI controller 111.

In some embodiments, the first LI device 500 is operative such that the transmission of a request for RNG data 400, the reception of RNG data 400, the checking of the randomness test result and the performance of the mitigating action are performed by an LI ADMF 109, and operative such that the testing of the RNG data 400, is performed by an LI mediation and distribution function, MF/DF 113, 115.

In some embodiments, the first LI device 500 is operative such that the transmission of a request for RNG data 400, the reception of RNG data 400, the checking of the randomness test result and the performance of the mitigating action are performed by an LI controller 111, and operative such that the testing of the RNG data 400, is performed by an LI MF/DF 113, 115.

In some embodiments, the first LI device 500 is operative such that the RNG data 400 comprises any of:
 a plurality of random number samples 402, 403, 404 generated in the second LI function,
 a value 401 representing a size of an entropy pool in an entropy source 123, 125, 131.

Figure 6:
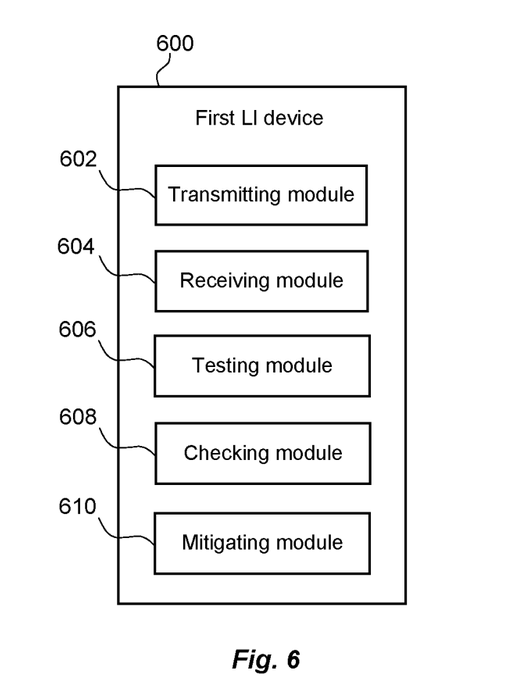

Turning now to FIG. 6, a first LI device 600 will be described in some detail. The first LI device 600, which may correspond to the first LI device 110 in FIG. 1, comprises:
 a transmitting module 602 configured to transmit, to a second LI function 101 in a virtualized network function, VNF 103, a request for random number generator, RNG, data 400, the RNG data 400 characterizing a RNG 105 in the second LI function 101,
 a receiving module 604 configured to receive, from the second LI function 101 in the VNF 103, the RNG, data 400,
 a testing module 606 configured to test the RNG data 400, resulting in a randomness test result that is indicative of randomness of random numbers generated by the RNG 105 in the second LI function 101, and
 a checking module 608 configured to check if the randomness is below a first threshold value,
 a mitigating module 610 configured to perform a mitigating action for at least mitigating any undesired effect associated with the randomness being less than the threshold value.

The first LI device 600 may comprise further modules that are configured to perform in a similar manner as, e.g., the first LI device 500 described above in connection with FIG. 5.

The invention claimed is:

1. A method performed by a first lawful interception, LI, function, the method comprising:
 transmitting, to a second LI function in a virtualized network function, VNF, a request for random number generator, RNG, data, said RNG data characterizing a RNG in the second LI function,
 receiving, from the second LI function in the VNF, the RNG data,
 testing the RNG data, resulting in a randomness test result that is indicative of randomness of random numbers generated by the RNG in the second LI function, and
 when the randomness is determined to be below a first threshold value, performing a mitigating action for at least mitigating any undesired effect associated with the randomness being less than the threshold value, wherein the first LI function communicates with the second LI function over an X interface and the first LI function communicates with a law enforcement agency (LEA) over a handover interface (HI).

2. The method of claim 1, wherein the mitigating action comprises:
 transmitting an alarm signal to a management entity.

3. The method of claim 1, wherein the mitigating action comprises:
 transmitting an alarm signal to the second LI function in the VNF.

4. The method of claim 1, wherein the mitigating action comprises:
 repeating, at least one repetition, reception of RNG data, testing of the RNG data, and for each repetition, if the randomness is above a second threshold value, transmitting an instruction to the second LI function in the VNF to restart.

5. The method of claim 1, wherein the mitigating action comprises:
transmitting, to a management entity, a request for re-instantiating the VNF.

6. The method of claim 1, wherein the mitigating action comprises:
transmitting a deactivation instruction to the second LI function in the VNF, the deactivation instruction comprising instructions for the second LI function in the VNF to stop.

7. The method of claim 1, wherein the mitigating action comprises:
transmitting, to the second LI function in the VNF, an entropy source reconfiguration instruction,
receiving, from the second LI function in the VNF, a request for a RNG seed,
obtaining a RNG seed from an entropy source in the first LI function, and
transmitting the RNG seed to the second LI function in the VNF.

8. The method of claim 1, wherein the transmission of a request for RNG data, the reception of RNG data, the testing of the RNG data, the checking of the randomness test result and the performance of the mitigating action are performed by an LI administrative function, ADMF.

9. The method of claim 1, wherein the transmission of a request for RNG data, the reception of RNG data, the testing of the RNG data, the checking of the randomness test result and the performance of the mitigating action are performed by an LI controller.

10. The method of claim 1, wherein the transmission of a request for RNG data, the reception of RNG data, the checking of the randomness test result and the performance of the mitigating action are performed by an LI ADMF, and wherein the testing of the RNG data, is performed by an LI mediation and distribution function, MF/DF.

11. The method of claim 1, wherein the transmission of a request for RNG data, the reception of RNG data, the checking of the randomness test result and the performance of the mitigating action are performed by an LI controller, and wherein the testing of the RNG data, is performed by an LI MF/DF.

12. The method of claim 1, wherein the RNG data comprises any of:
a plurality of random number samples generated in the second LI function,
a value representing a size of an entropy pool.

13. The method of claim 1, wherein the second LI function is configured to perform a set of actions comprising:
receiving, from the first LI function outside the VNF, the request for the RNG data,
obtaining the RNG data, said RNG data characterizing a RNG in the second LI function, and
transmitting the RNG data to the first LI function.

14. The method of claim 13, wherein the set of actions further comprise:
receiving, from the first LI function, an alarm signal, analysing the alarm signal, and
stopping LI as a consequence of the analysis of the alarm signal.

15. The method of claim 13, wherein the set of actions further comprise:
receiving, from the first LI function, an instruction to restart, and
restarting LI.

16. The method of claim 13, wherein the set of actions further comprise:
receiving, from the first LI function, a deactivation instruction, the deactivation instruction comprising instructions for the LI function in the VNF to stop, and
stopping LI.

17. The method of claim 13, wherein the set of actions further comprise:
receiving, from the first LI function, an entropy source reconfiguration instruction,
reconfigure, based on the received reconfiguration instruction, entropy source information associated with the RNG,
transmitting, to the first LI function, a request for a RNG seed, and
receive an RNG seed from the first LI function.

18. The method of claim 13, wherein the RNG data comprises any of:
a plurality of random number samples generated in the second LI function,
a value representing a size of an entropy pool in an entropy source.

19. A first lawful interception, LI, device, comprising input/output circuitry, a processor and a memory, said memory containing instructions executable by said processor whereby said first LI device is operative to:
transmit, to a second LI function in a virtualized network function, VNF, a request for random number generator, RNG, data, said RNG data characterizing a RNG in the second LI function,
receive, from the second LI function in the VNF, the RNG data,
test the RNG data, resulting in a randomness test result that is indicative of randomness of random numbers generated by the RNG in the second LI function, and
when the randomness is determined to be below a first threshold value, perform a mitigating action for at least mitigating any undesired effect associated with the randomness being less than the threshold value,
wherein the first LI function communicates with the second LI function over an X interface and the first LI function communicates with a law enforcement agency (LEA) over a handover interface (HI).

20. The first LI device of claim 19, operative such that the mitigating action comprises:
transmitting an alarm signal to a management entity.

21. The first LI device of claim 19, operative such that the mitigating action comprises:
transmitting an alarm signal to the second LI function in the VNF.

22. The first LI device of claim 19, operative such that the mitigating action comprises:
repeating, at least one repetition, reception of RNG data, testing of the RNG data, and
for each repetition, if the randomness is above a second threshold value, transmitting an instruction to the second LI function in the VNF to restart.

23. The first LI device of claim 19, operative such that the mitigating action comprises:
transmitting, to a management entity, a request for re-instantiating the VNF.

24. The first LI device of claim 19, operative such that the mitigating action comprises:

transmitting a deactivation instruction to the second LI function in the VNF, the deactivation instruction comprising instructions for the second LI function in the VNF to stop.

25. The first LI device of claim 19, operative such that the mitigating action comprises:
transmitting, to the second LI function in the VNF, an entropy source reconfiguration instruction,
receiving, from the second LI function in the VNF, a request for a RNG seed,
obtaining a RNG seed from an entropy source in the first LI function, and
transmitting the RNG seed to the second LI function in the VNF.

26. The first LI device of claim 19, operative such that the transmission of a request for RNG data, the reception of RNG data, the testing of the RNG data, the checking of the randomness test result and the performance of the mitigating action are performed by an LI administrative function, ADMF.

27. The first LI device of claim 19, operative such that the transmission of a request for RNG data, the reception of RNG data, the testing of the RNG data, the checking of the randomness test result and the performance of the mitigating action are performed by an LI controller.

28. The first LI device of claim 19, operative such that the transmission of a request for RNG data, the reception of RNG data, the checking of the randomness test result and the performance of the mitigating action are performed by an LI ADMF, and wherein the testing of the RNG data, is performed by an LI mediation and distribution function, MF/DF.

29. The first LI device of claim 19, operative such that the transmission of a request for RNG data, the reception of RNG data, the checking of the randomness test result and the performance of the mitigating action are performed by an LI controller, and wherein the testing of the RNG data, is performed by an LI MF/DF.

30. The first LI device of claim 19, operative such that the RNG data comprises any of:
a plurality of random number samples generated in the second LI function,
a value representing a size of an entropy pool in an entropy source.

* * * * *